US012597405B2

(12) United States Patent
Watson

(10) Patent No.: US 12,597,405 B2
(45) Date of Patent: Apr. 7, 2026

(54) AUTO-RECORDING FOR MUSICAL INSTRUMENT

(71) Applicant: Scott Watson, Bel Air, MD (US)

(72) Inventor: Scott Watson, Bel Air, MD (US)

( * ) Notice: Subject to any disclaimer, the term of this patent is extended or adjusted under 35 U.S.C. 154(b) by 592 days.

(21) Appl. No.: 17/676,196

(22) Filed: Feb. 20, 2022

(65) Prior Publication Data

US 2022/0335914 A1 Oct. 20, 2022

Related U.S. Application Data

(60) Provisional application No. 63/176,241, filed on Apr. 17, 2021.

(51) Int. Cl.
*G10H 1/00* (2006.01)
*G10D 1/08* (2006.01)

(52) U.S. Cl.
CPC ........... *G10H 1/0041* (2013.01); *G10D 1/085* (2013.01); *G10H 1/0008* (2013.01); *G10H 2240/165* (2013.01)

(58) Field of Classification Search
CPC ............... G10H 1/0041; G10H 1/0008; G10H 2240/165; G10D 1/085
See application file for complete search history.

(56) References Cited

U.S. PATENT DOCUMENTS 4,130,739 A * 12/1978 Patten .............. G11B 20/00007 369/47.36
4,748,887 A * 6/1988 Marshall .............. G10H 1/0066 84/645
5,637,823 A * 6/1997 Dodge ..................... G10H 3/18 84/743
2005/0096764 A1* 5/2005 Weiser ................. G11B 27/034
2008/0212439 A1* 9/2008 Chan ........................ G10D 3/00 369/69
2012/0036983 A1* 2/2012 Ambrosino ............ G10H 3/183 84/731
2015/0107444 A1* 4/2015 Pezeshkian .............. G10H 1/34 84/645
2015/0139440 A1* 5/2015 Crawford ............... G10H 3/186 381/77
2016/0293145 A1* 10/2016 Chapman ............... G10D 3/095

FOREIGN PATENT DOCUMENTS

KR 20090108175 A * 10/2009 ............... H04R 3/00

OTHER PUBLICATIONS

Zoom (https://www.youtube.com/watch?v=kYnjxBJ72yc, published Mar. 28, 2010 (Year: 2010).*

* cited by examiner

*Primary Examiner* — Jeffrey Donels
*Assistant Examiner* — Philip G Scoles
(74) *Attorney, Agent, or Firm* — Clifton Leon Anderson

(57) ABSTRACT

An apparatus for archiving music created on guitars including acoustic and electric, comprising an archiving device configured to record as well as archive any combination of riffs, songs, and leads comprises a PCB that comprises all the electrical connections along with a pair of batteries to power up the archiving device, wherein the PCB comprises a controller configured to detect music played on the said guitar and automatically record the music played upon a memory card inserted into the memory card slot; a disc-shaped user interface plate that sits beneath a knob of a potentiometer on the top surface of the said guitar, wherein the user interface plate has a plurality of buttons, a plurality of LEDs, a memory card slot, and a USB slot.

16 Claims, 6 Drawing Sheets

AUTO-RECORDING FOR MUSICAL INSTRUMENT

BACKGROUND

Field of the Invention

Embodiments of the present invention generally relate to an apparatus recording and archiving music from a musical instrument and particularly to an apparatus for recording and archiving musical riffs, lead from a guitar.

Description of Related Art

In the past, recordings of music generated by musical instruments were created on various recording media such as musical records, cassette type, or other forms of magnetic recording media. The recordings of such music were usually created for public listening and a great deal of care was taken to create a "master recording with the highest quality of musical sound that was possible so that many multiple recordings could be generated from the "master recording for dissemination to the public.

While most of these recordings were previously for public listening, the musicians playing various musical instruments were very desirous of recording of musical sounds that they generated. Also, musicians are so much indulged in creating music that they create music not only in studios but they think of new tunes, hymns, riffs every time. Traditional musicians carry recorders, write their ideas down on paper, or remember the exact rhythm or meter of their newly created riff. Every time they have to stop and manually turn on the recorders or write the created riffs they can lose focus.

Thus, musical recordings for public use and listening pleasure are on a macroscopic level relative to creating musical recordings of a single musical instrument for the musician playing the musical instrument which is on a microscopic level.

Very expensive sound recording studios were used to try to eliminate noise that reduced the quality of the musical sounds that were to be recorded. However, as a practical matter, musicians desiring to play their musical instruments could not race over to a sound recording studio every time they were playing their musical instruments to try to record high-quality musical sounds from their musical instruments.

There is thus a need for a device for recording as well as archiving the music played upon the guitar in a more efficient manner.

SUMMARY

Most electric guitars include knobs, aka, "pots", so-called as they control potentiometers which, in turn, control output volume and/or tone. The cables, potentiometers, and other circuitry carrying and modifying signals from the pickups to the guitar output are typically located in an electronics cavity 108 between the front (string side) and back of the guitar. The present invention provides for swapping a printed circuit board (PCB) carrying a potentiometer or other component with circuitry providing for recording audio signals. The new circuitry can include a mode corresponding to the control sacrificed to include recording. For example, buttons or other mode controls (on the front face of the guitar) can have a new "pot" to provide for the sacrificed control along with recording controls.

One objective of the invention is to avoid the loss of material and the regret that results when music that should have been recorded is produced but not recorded. As music is played, it is converted to non-digital (e.g., analog) electrical signals by the pickups and then converted to digital by the recording system. Accordingly, as a first approximation, the present invention can be considered as beginning recording when music production, e.g., picking, and/or strumming, begins.

To ensure full capture of the sound that triggered long-form recording, a default standby mode provides for continuous recording while overwriting or otherwise deleting all but the most recent short-period (e.g., one second) of the music recorded in standby mode. A music detection (above a predetermined threshold) then terminates the deleting and continues recording, now in long-form recording mode. Long-form recording mode can be terminated manually using controls on the guitar front or automatically, e.g., in response to detection that a termination criterion is met, e.g., 10 seconds with no signal above a given threshold detected. At least in the latter case, the recording mode can switch to standby.

Embodiments in accordance with the present invention provide an apparatus for archiving music created on a handheld musical instrument selected from a class of guitars including acoustic and electric. The apparatus includes an archiving device configured to record as well as archive any combination of riffs, songs, and leads created by a user upon a musical instrument selected from a class of guitars including acoustic and electric. The archiving device further comprises a PCB that comprises all the electrical connections along with a pair of batteries to power up the archiving device. The PCB further comprises a controller configured to detect music played on the guitar and automatically record the music played upon a memory card inserted into the memory card slot. The archiving device further comprises a disc-shaped user interface plate that sits beneath a knob of a potentiometer on the top surface of the guitar, wherein the user interface plate has a plurality of buttons, a plurality of LEDs, a memory card slot, and a USB slot.

Embodiments of the present invention provide a number of advantages depending on its particular configuration. First, embodiments of the present application provide an archiving device for automatic recording of music played upon the guitar. Next, embodiments of the present application provide a device that exactly records the way the music was played.

Next, embodiments of the present application provide a device that records audio in the highest quality.

Next, embodiments of the present application provide a device that enables easy import of recorded music into digital audio recording software.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

Figure 1:
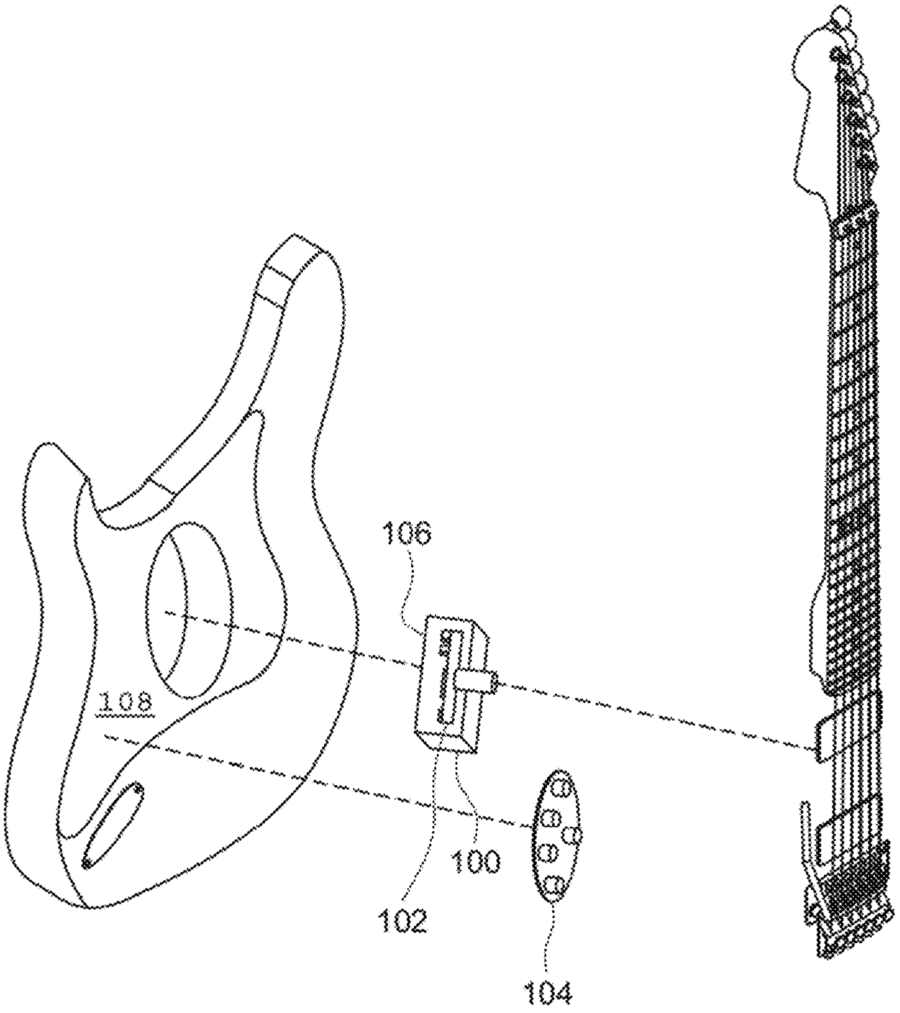
FIG. 1 is an exploded view of a guitar including an archiving device, according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a", "an", and "the" designate both the singular and the plural, unless expressly stated to designate the singular only.

FIG. 1 illustrates a perspective view of an archiving device 100, according to an embodiment of the present invention. The archiving device 100 may be a device that may be configured to record everything such as, but not limited to, riffs, leads, songs, played by a user upon a handheld musical instrument selected from a class of guitars including acoustic and electric. According to embodiments of the present invention, the archiving device 100 may be configured to archive everything such as, but not limited to, riffs, leads, songs, played by a user upon a handheld musical instrument selected from a class of guitars including acoustic and electric.

According to embodiments of the present invention, the archiving device 100 may be designed in a manner that it is fixed inside the guitar. The archiving device 100 is fixed in a manner that it replaces the tone knob of the guitar with a potentiometer of the archiving device 100. According to embodiments of the present invention, the guitars may be Fender, Gibson, Paul Reed Smith, Ibanez, ESP, LTD, Epiphone, Gresch, Dean, Godin, Schecter, Jackson, Rickenbacker, Yamaha, Peavey, Charvel, Squire, Danelectro, Guild, Washburn, G&L, and so forth. Embodiments of the present invention are intended to include or otherwise cover any type of guitars including known, related art, and/or later developed technologies.

The archiving device 100 comprises a plurality of electronic components embedded onto a printed circuit board (PCB) 102. In an embodiment of the present invention, a user interface plate 104 may be connected to the PCB 102. The PCB 102 of the archiving device 100 may be housed within a casing 106. Further, the PCB 102 will be explained in conjunction with FIG. 2.

Furthermore, the casing 106 may be made up of a material, such as, but not limited to, an iron, an aluminum, a wood, a fiberglass, a chromed steel, a steel, a stainless steel, a plastic, a carbon fiber, an aluminum, a leather, a Poly Vinyl Chloride (PVC), a hardened plastic, and so forth. Embodiments of the present invention are intended to include or otherwise cover any type of the material for the casing 106 of the archiving device 100 including known, related art, and/or later developed technologies. According to embodiments of the present invention, the casing 106 may be strong enough to withstand the shock of a dropped or knocked over guitar.

According to embodiments of the present invention, the shape of the casing 106 may be, but is not limited to, a cuboid, a cube, a hexagonal, a square, a rectangular, a pentagonal, a heptagonal, an octagonal, a nonagonal, a decagon and so forth. Embodiments of the present invention are intended to include or otherwise cover any of the shape of the casing 106 including known, related art, and/or later developed technologies. In a preferred embodiment of the present invention, the casing 106 may be of a dimension 2 inches×2 inches×2 inches. The casing 106 may have an opening on the top surface for easy fitment of the potentiometer onto the knobs of the guitars.

According to embodiments of the present invention, the user interface plate 104 may be designed to sit beneath a knob of a potentiometer on the top surface of the guitar. The user interface plate 104 may be made up of a material selected from a soft plastic, a hard plastic, and so forth. In another embodiment of the present invention, the user interface plate 104 may be made up of a non-abrasive material. Embodiments of the present invention are intended to include or otherwise cover any type of the material of the user interface plate 104 including known, related art, and/or later developed technologies. According to embodiments of the present invention, the user interface plate 104 may be a colored plate. The plate may be of a color selected from one of, violet, indigo, blue, green, yellow, orange, red, and so forth. Embodiments of the present invention are intended to include or otherwise cover any type of the color including known, related art, and/or later developed technologies. Further, the user interface plate 104 will be explained in conjunction with FIG. 3.

Figure 2:
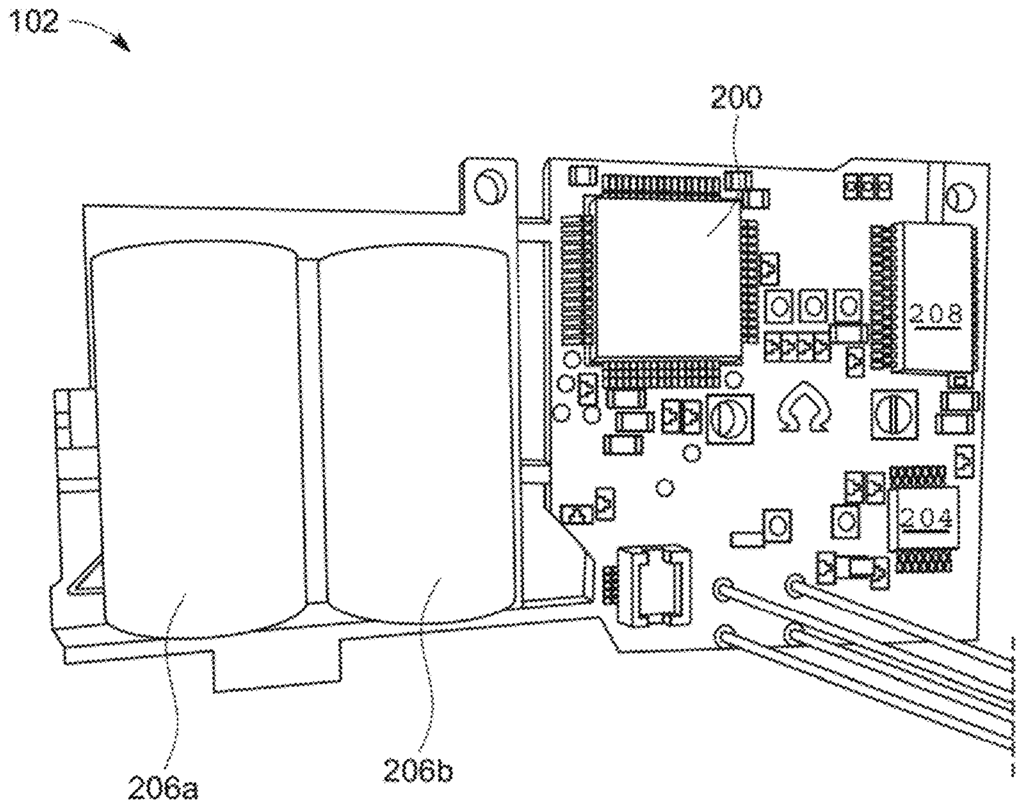
FIG. 2 depicts backside view of the PCB of the archiving device, according to an embodiment of the present invention.

FIG. 2 depicts the backside view of the PCB 102 of the archiving device 100, according to another embodiment of the present invention. The PCB 102 comprises a plurality of electronic components such as, but not limited to, a controller 200, an ADC/DAC 202, an output amplifier 204, batteries 206*a* and 206*b*, and so forth.

According to embodiments of the present invention, the controller 200 may be configured to automatically begin recording the music, riff, leads, song played by the user upon the guitar. In another embodiment of the present invention, the controller 200 may be configured to archive the recorded music, riff, leads, song, upon a memory card. According to embodiments of the present invention, the controller may be selected from one of, a microprocessor, a microcontroller, Programmable Logic Control unit (PLC), and so forth. Embodiments of the present invention are intended to include or otherwise cover any type of the controller 200 including known, related art, and/or later developed technologies Further, the controller may be connected to the ADC/DAC 202, and the output amplifier 204. In a preferred embodiment of the present invention, the controller 200 gets activated only when the user starts playing a piece of music. In an exemplary scenario, the audio signal generated by playing the guitar is amplified for current and voltage by a pre amplifier 208 installed on the PCB 102 and represented by a voltage. The peak of the voltage is detected and when the peak of the voltage matches a threshold, an activation signal is generated and transmitted to the controller 200. The activation signal may trigger the controller 200 to exit the low power state and start recording the music played upon the guitar. According to an embodiment of the present invention, the controller 200 may be configured to interact with user devices via Bluetooth.

According to embodiments of the present invention, the ADC/DAC 202 may be configured to convert analog input audio signal received from pre-amplifier 208 to digital signal. The converted signal may be processed by onboard RAM (not shown) where the RAM detects the music. According to another embodiment of the present invention, the ADC/DAC 202 may also be configured to convert the digital signal received from the controller 200 to an analog signal that may be amplified by the output amplifier 204. The amplification by the output amplifier 204 helps the music to be played in a headphone or on a speaker.

In another exemplary scenario, the controller 200 may be configured to record and archive the music on a memory card, until a silence threshold is reached for a set amount of time. The set amount of time may be, 1 minute, 1.5 minutes, 2 minutes, and so forth. Embodiments of the present invention are intended to include or otherwise cover any set amount of time. Also, after the set amount of time, the controller 200 may again go to sleep. The automatic activation and deactivation of the controller 200 may help the archiving device 100 to save power allowing the archiving device 100 to be ready always with sufficient power.

According to embodiments of the present invention, the archiving device 100 may be supplied power through one of the batteries 206*a*-206*b* (hereinafter referred to as batteries 206). The batteries 206 may be connected to the PCB 102 using connecting wires. According to embodiments of the present invention, the batteries 206 may be rechargeable which means the user may charge the batteries using a power supply. According to another embodiment of the present invention, the batteries 206 may be selected from, AA batteries, AAA batteries, lithium ion batteries, nickel metal hydride batteries, nickel cadmium batteries, and so forth. Embodiments of the present invention are intended to include or otherwise cover any type of the batteries 206 including known, related art, and/or later developed technologies.

Figure 3:
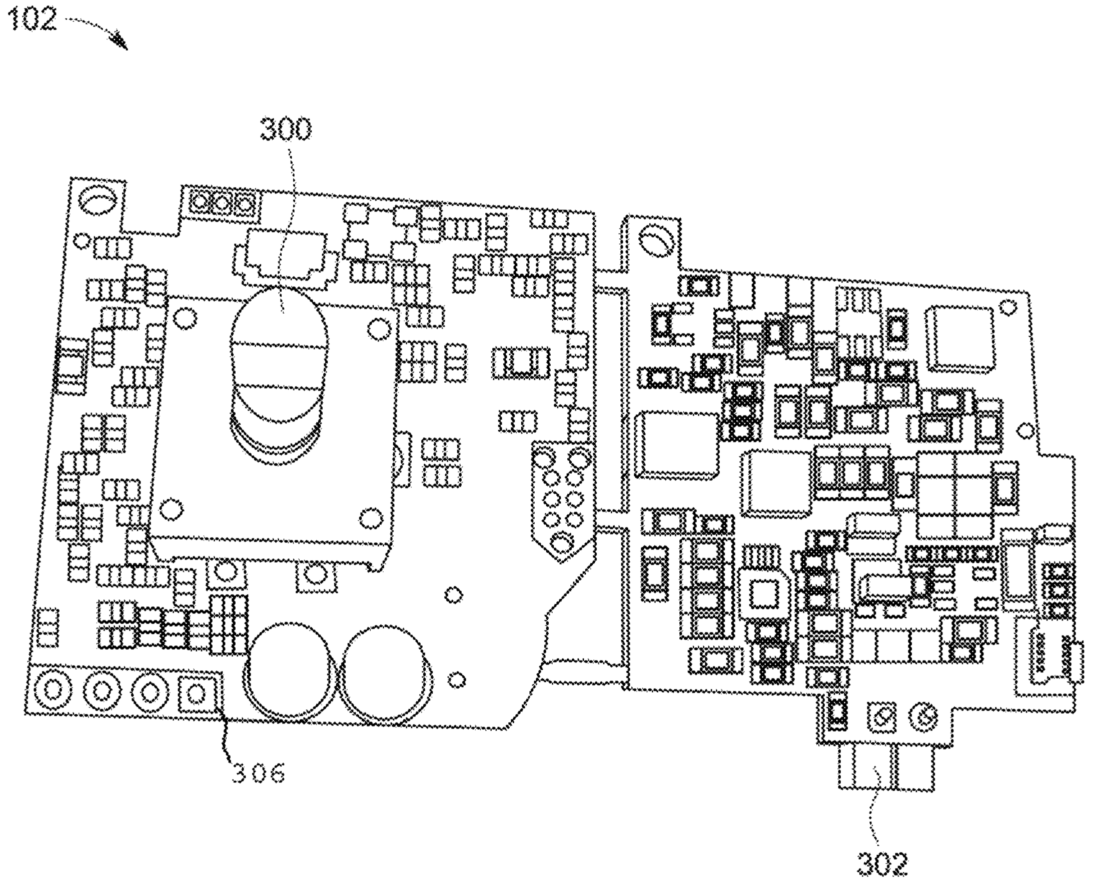
FIG. 3 depicts a frontside view of the PCB 102 of the archiving device, according to an embodiment of the present invention.

FIG. 3 depicts a front view of the PCB 102 of the archiving device 100, according to embodiments of the present invention. The PCB 102 further comprises a rotary encoder 300 that may be fixed to the knob of the guitar. In an embodiment of the present invention, the rotary encoder 300 may be pressed to control the functioning of the archiving device 100. The PCB 102 further comprises a connection for headphone/output line 302 along with instrument input connection 304. Further, the PCB 102 may be connected to the user interface plate 104 through a connection port 306 located on the PCB 102. The connection may be established between the PCB 102 and the user interface plate 104 through a connecting wire. Furthermore, the PCB 102 may be stacked one over another to conserve space making the archiving device 100 compact and smaller in size ready to be fixed to any guitar.

Figure 4:
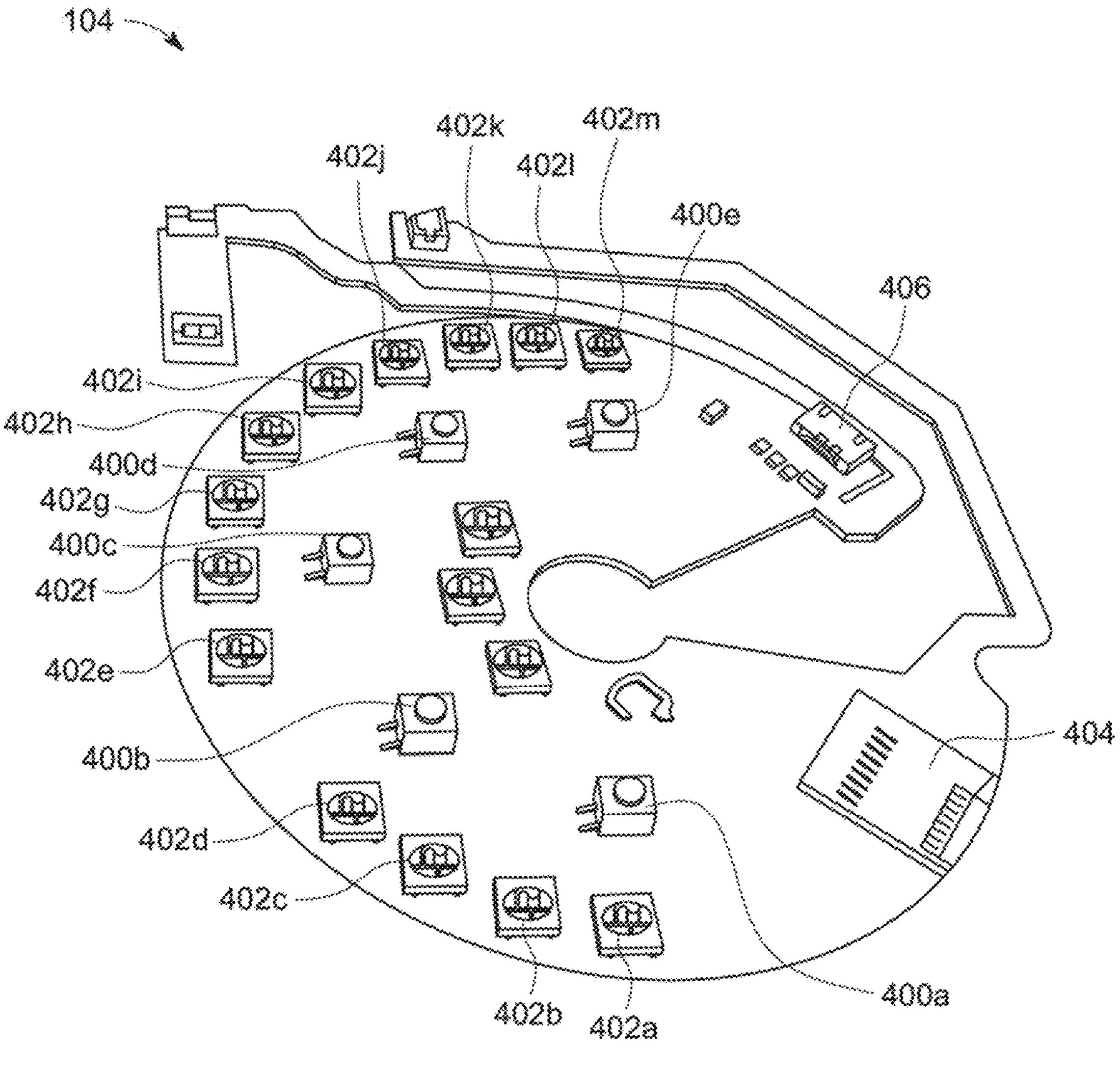
FIG. 4 depicts the user interface plate 104 of the archiving device, according to an embodiment of the present invention.

FIG. 4 depicts the user interface plate 104 of the archiving device 100, according to an embodiment of the present invention. The user interface plate 104 may be pasted upon the top surface of the guitar beneath the knob using a number of possible adhesion methods. In another embodiment of the present invention, the user interface plate 104 may be of different colors to match the surface of the guitar.

Further, the user interface plate 104 comprises a plurality of buttons 400*a*-400*e*, a plurality of LEDs 402*a*-402*m*, a memory card slot 404, a USB slot 406, and so forth.

The plurality of buttons 400*a*-400*e* (hereinafter referred to as 400) may be configured to control the various functions of the archiving device 100. The buttons 400 may be configured to activate, playback, or select within a mode by pushing the appropriate buttons on the user interface plate 104. According to embodiments of the present invention, the buttons 400 may be selected from, a push button, a touch button, a toggle button, and so forth. Embodiments of the present invention are intended to include or otherwise cover any type of buttons 400 including known, related art, and/or later developed technologies. According to embodiments of the present invention, the buttons 400 may be, but are not limited to, power button 400*a*, playback button 400*b*, looper button 400*c*, gate button 400*d*, tone selection button 400*e*, and so forth. Further, more buttons 400 may be added to the user interface plate 104.

In an exemplary scenario, the user may press power button 400*a* on the user interface plate 104 for a predefined period to turn OFF the archiving device 100. The predefined period is 5 seconds. Similarly, the user may press the power button 400*a* for a predefined period to turn ON the archiving device 100.

In another exemplary scenario, the user may press playback button 400*b* on the user interface plate 104 to begin playback of the last recorded sample. Similarly, the user may press playback button 400*b* on the user interface plate 104 to stop the playback.

In yet another embodiment of the present invention, the user may press looper button 400*c* on the user interface plate 104 to start the playback of the sample. Looper button 400*c* may enable the user to enter into the looper mode. The looper mode plays the current sample as the default playback file on loop. Similarly, the user may press looper button 400*c* on the user interface plate 104 to stop the playback. Further, anything played while the looper playback system is engaged shall be recorded as usual minus the playback audio channel.

In yet another embodiment of the present invention, the user may alter the gate section time by pressing gate button 400*d*. Further, the user may adjust the gate time by turning the rotary encoder 300 clockwise to expand or increase the attack time. Similarly, the user may turn the rotary encoder counterclockwise to decrease the attack time.

In yet another embodiment of the present invention, the user may press tone selection button 400*e* to operate the archiving device 100 in the background and use the rotary encoder 300 as a tone knob of the guitar. The user may rotate the knob to adjust the tone of the guitar.

According to embodiments of the present invention, the plurality of LEDs 402*a*-402*m* (hereinafter referred to as LEDs 402) may be installed on the user interface plate 104. The LEDs 402 may shine to denote various data associated with the archiving device 100. According to embodiments of the present invention, the LEDs 402 may be of different colors selected from, green, red, yellow, orange, white, blue, and so forth. Embodiments of the present invention are intended to include or otherwise cover any type of colored LEDs 402 including known, related art, and/or later developed technologies. In a preferred embodiment of the present invention, the user interface plate 104 may have 10 LEDs 402 placed at equal distance from each other. In an embodiment of the present invention, the intensity of the LEDs 402 decreases after 15 seconds of inactivity. In another embodiment of the present invention, the LEDs 402 may be configured to indicate when the archiving device 100 enters a low power standby mode.

According to an embodiment of the present invention, the LEDs 402 may be configured to indicate the battery status of the archiving device 100. The LEDs 402 may indicate the status of the battery when it is below 2 hours. In an exemplary scenario, a slow blinking red LED that increases in speed as the unit loses power may be used.

According to another embodiment of the present invention, the LEDS 402 may be configured to light the selected section of the user interface plate 104 with the color associated with each mode. The modes may be looper mode, playback mode, and tuner mode. In an exemplary scenario, if the archiving device is in looper mode then the LED's 402 may illuminate the looper section of the user interface plate 104, i.e. the area around the looper button. In another exemplary scenario, if the archiving device 100 is in looper mode then only LEDs 402 at an even position may light.

According to yet another embodiment of the present invention, if the archiving device 100 is in playback mode, the archiving device 100 will show which file is in use by the placement of 10 LEDs that are around the plate. In an exemplary scenario, the archiving device 100 will be able to notate samples 1 through 100 by having a green light allocate the 10's group position and a red light as the I's group position. If the sample location has the same 10 and 1 position, then the light will alternate green to red.

According to embodiments of the present invention, the memory card slot 404 may be installed upon the user interface plate 104 to receive a non-volatile memory card. In another embodiment of the present invention, the memory card slot 404 may be configured to receive one of, but not limited to micros SD card, a SD card, and so forth. Embodiments of the present invention are intended to include or otherwise cover any type of the memory card including known, related art, and/or later developed technologies. According to embodiments of the present invention, the memory card may be configured to archive all the music, riffs, leads played upon the guitar without letting the user lose any of his work. Further, the memory card slot 404 may enable the user to easily insert a memory card and remove the memory card for the purpose of data transfer.

According to embodiments of the present invention, the USB slot 406 may be designed upon the user interface plate 104 to receive USB cables. The USB slot 406 may receive USB cables to charge the batteries 106 of the archiving device 100, according to an embodiment of the present invention. The USB slot 406 may also receive the USB cables to transfer the data from the memory card to a user device. According to embodiments of the present invention, the transfer of data may enable clearing up of space of the memory card making it ready to receive other recordings. In another embodiment of the present invention, the USB slot 406 allows firmware and diagnostic settings to be accessed and upgraded by the user.

Furthermore, the user interface plate 104 may be connected to the PCB 102 of the archiving device 100 using a connecting wire. The connecting wire may be connected to the slot 408 of the user interface plate 104. According to embodiments of the present invention, the user interface plate 104 may be ¼ inch thick. The thickness of a quarter of an inch enables easy adhesion of the user interface plate 104 upon the guitar.

Figure 5:
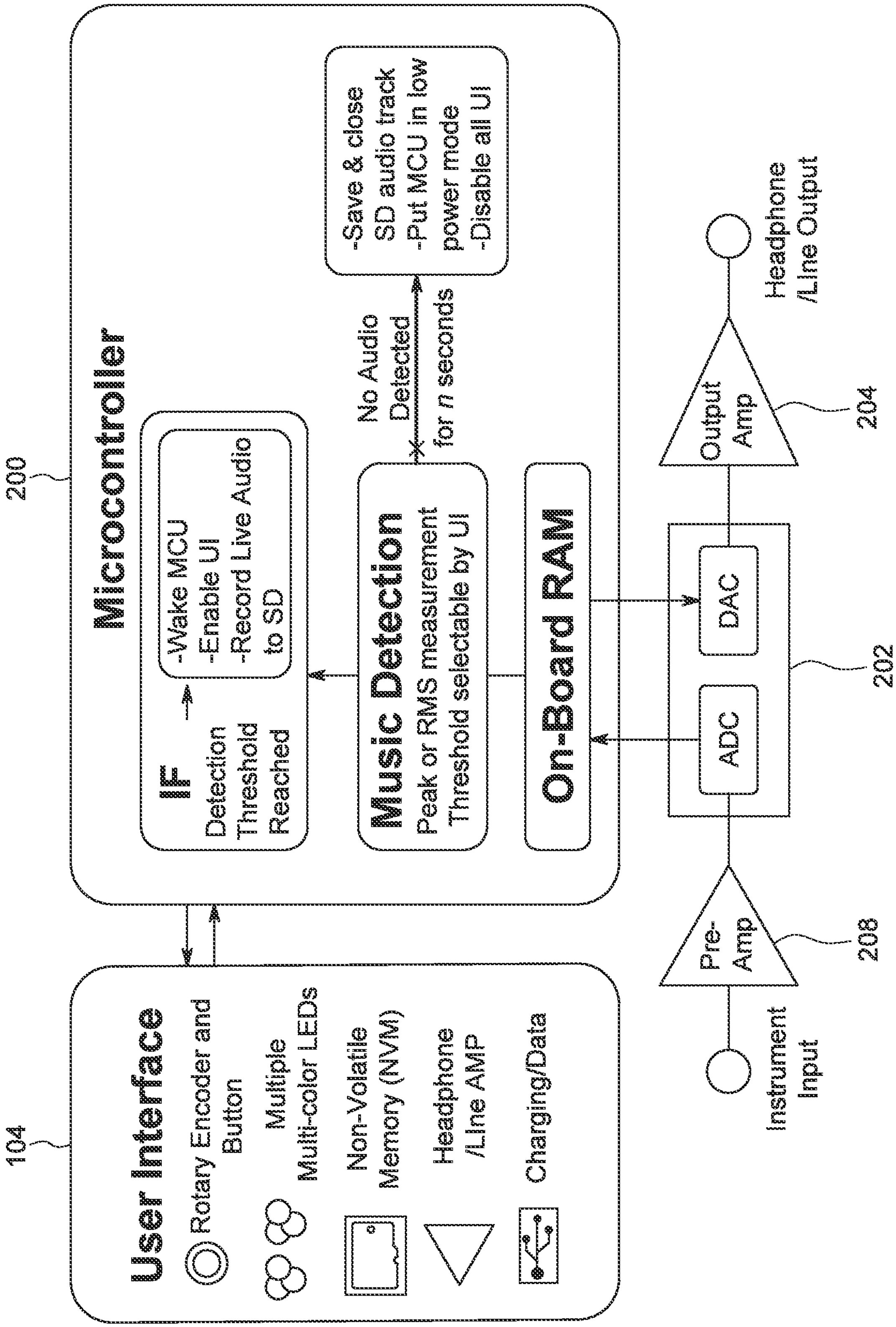
FIG. 5 depicts a block diagram of automatic audio detection in the archiving device 100, according to an embodiment of the present invention.

FIG. 5 depicts a block diagram of automatic audio detection in the archiving device 100, according to embodiments of the present invention.

Automatic audio detection is a feature of the archiving device 100 that gives it an edge over other music recording means for a musical instrument. Further, for implementing the automatic audio detection in a guitar, the archiving device 100 makes use of the pre-amplifier 208, the ADC/DAC 202, the controller 200, and the output amplifier 204.

Initially, the hardware and firmware of the archiving device 100 are in a low-power state until audio is intentionally played by the user. As soon as the user plays the guitar, an audio signal is generated by the guitar. The generated audio signal is amplified for current and voltage by the pre-amplifier 208 and represented by a voltage. Later, the peak of this voltage or an RMS value is detected by the random access memory (RAM) of the controller 200 using the computer implemented code:

```
msTimer; II millisecond timing variable, incremented externally by
HW or interrupt
  if(ADC_READY_FLAG){
     }
  int aud = getADC( ); // get incoming audio
  int aud_abs = get_absolute_value(aud) // convert to absolute value
  aud_RMS += rolling_average(aud_abs); // filter absolute value
  if(aud_RMS > user_set_threshold){ // if input RMS value exceeds a
threshold
  wake( ); // wake up the controller and record
  record_to_NVM( ); // record audio to memory card
  }
```

When a predefined threshold is met, an activation signal is generated that may be used to trigger the controller 200 and other hardware to enable recording and exit the low-power state. According to embodiments of the present invention, the threshold may be selected by the user through the user interface plate 104. The controller 200 may then record the played audio to a memory card inserted into the memory card slot 404. The controller 200 may record audio at a minimum of 44.1 kHz 16-bit. The controller 200 continues to monitor the recorded audio until a silence threshold is reached for a set amount of time, demarking the recording as a single track. The set amount of time may be, 1 minute, 1.5 minutes, 2 minutes, and so forth. Embodiments of the present invention are intended to include or otherwise cover any set amount of time. Further, the controller 200 and other hardware then go back to sleep after some time. The transition from an active state to a low power state saves power and allows the archiving device 100 to be always ready to record. The archiving device 100 using the automatic recording feature enables the user to always save their musical recordings.

Figure 6:
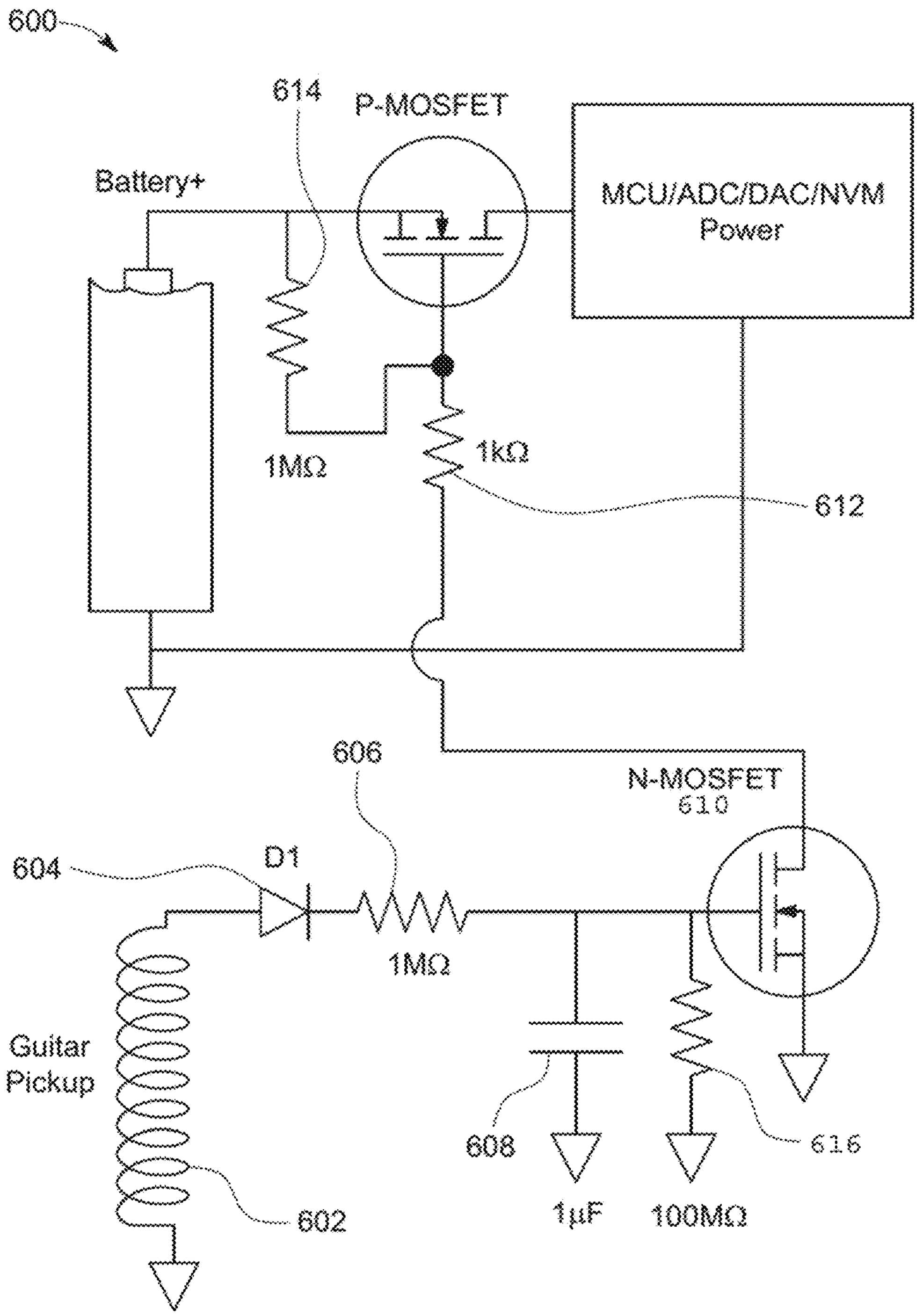
FIG. 6 illustrates automatic detection recording hardware, according to an embodiment of the present invention.

FIG. 6 illustrates an automatic detection recording hardware 600, according to embodiments of the present invention.

Referring to FIG. 6, automatic detection recording hardware 600 comprises guitar pickup 602, first diode 604, a first resistor 606, a first capacitor 608, a MOSFET 610, a second resistor 612, a third resistor 614, a fourth resistor 616, and so forth. The first resistor 606 is 1 M ohm. The second resistor is 100 M ohm. The third resistor is 1 k ohm. The fourth resistor is 1 M ohm. Similarly, the first capacitor is 1 microfarad.

The guitar pickup 602 has a high impedance (1 megaohm) resistor in series with a diode 604. This half-bridge rectification is similar to absolute value. The first resistor 606 charges up the first capacitor 608 of 1 microfarad. The charging up of the first capacitor 608 sets a delay based component to the detection, here a time-constant of 1 second. The first diode 604 can be a normal or Schottky diode or even a Zener for really high output pickups or high noise environments. The first diode 604 plus the V G-S turn-on voltage of the MOSFET will set the RMS detection voltage. A high resistance divider is used on the G-S for fine-tuning. Likewise, a comparator and/or voltage reference (like TL431) can be used for a more precise and adjustable detection threshold.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

Herein, all art labeled "prior art", if any, is admitted prior art; all art not labeled "prior art", if any, is not admitted prior art. The described embodiments, variations thereupon, and modifications thereto are provided for by the present invention, the scope of which is defined in the accompanying claims.

What is claimed is:

1. A music recording system for a stringed musical instrument having a front surface on which is disposed a pickup set including at least one pickup that converts string vibrations to a music signal in which music is encoded and having a body in which a tone-control cavity is defined, the music recording system comprising:

a recorder for implementing recorder functions including recording and playback of the music signal, the recorder being mounted in the tone-control cavity from which a tone-control system having a tone-control interface enabling musician control of a tone or volume of the music signal has been removed, the recorder being electrically coupled to the pickup set for receiving, digitizing and recording the music signal; and a recorder interface having a mode selector and a knob mechanically coupled through the front surface to the recorder, the mode selector being operable to switch between operating modes including:

a first mode in which the knob can be manipulated to control the tone or volume of the music signal as it is being recorded, and a second mode in which the knob can be manipulated to control a recording parameter other than the tone or the volume of the music signal.

2. The music recording system of claim 1 further comprising:

a detector that detects:

a trigger condition in which a volume of the music signal increases to meet or exceed a first threshold; and a time-out condition in which the volume of the music signal decreases to a second threshold or below; and a controller coupled to the detector and the recorder so as to:

cause the recorder to record the digital music signal in response to detection of the trigger condition, and, in response to a detection of the time-out condition, initiate a time out period at the end of which the controller causes the recorder to stop recording the music signal unless the detector detects the trigger condition during the time-out period, wherein the recorder includes a rotary encoder that replaces a potentiometer of the tone-control system, the rotary encoder being coupled to the knob.

3. The music recording system of claim 1 wherein the music signal is a musical instrument Hi-Z signal, and wherein the recorder includes an analog-to-digital converter (ADC) to perform the digitizing of the musical instrument Hi-Z signal.

4. The music recording system of claim 1 wherein the operating modes include a pre-record mode and a long-record mode, the recorder:

when in the pre-record mode, recording a most recent pre-record duration of input on a first-in-first-out basis so as to capture a beginning of a music phrase, and when in the long-record mode, recording for a real-time duration, the controller switching from the pre-record mode to the long-record mode in response to detection of the trigger condition so that the real-time duration recording is appended to the pre-record duration recording.

5. The music recording system of claim 4 wherein the controller causes the recorder to switch from long-record mode to pre-record mode in response to detection of the time-out condition.

6. The music recording system of claim 1 wherein the musical instrument is an electric guitar.

7. A music recording process comprising:

removing a tone-control system having a tone-control interface enabling musician control of a tone or a volume of a music signal from a tone-control cavity of a stringed musical instrument having a front surface on which is disposed a pickup set including at least one pickup for converting string vibrations to the music signal;

installing:

a recorder in the tone-control cavity so that it is electrically coupled to the pickup set for receiving, digitizing, and recording the music signal; and a recorder interface to having a knob coupled to the recorder through the front surface;

recording, by the recording system, the music signal;

in a first mode of the recorder, manipulating the knob to control the tone or volume of the music signal as it is being recorded, and, in a second mode, manipulating the knob to control a recording parameter other than the tone or volume of the music signal.

8. The music recording process of claim 7 further comprising detecting, using the recording system, a trigger condition, wherein the recording is in response to the detecting, and wherein the removing includes removing a potentiometer and the installing includes replacing the potentiometer with a rotary encoder of the recording system.

9. The music recording process of claim 8 further comprising switching between:

a first recorder mode in which a knob of the recorder interface is operable to control the tone or volume of the music signal, the knob being coupled to the rotary encoder; and a second recorder mode in which the knob is operable to control a value of a parameter associated with a recorder function of recording the music signal and playing back a recording of the music signal.

10. The music recording process of claim 7 wherein the recorder has a pre-record mode, the recorder, when in the pre-record mode, capturing a most recent pre-record duration of the music signal on a first-in-first-out basis, the controller switching from the pre-record mode to a long-record mode in response to detection of a trigger condition so that the recorder records the pre-record duration of the music signal followed by a subsequent duration of the music signal.

11. The music recording process of claim 10 wherein the recording system switches from a record mode to the pre-record mode upon termination of the recording.

12. The music recording process of claim 7 wherein the stringed musical instrument is an electric guitar.

13. A musical instrument comprising:

a body;

a string set of one or more strings;

a pickup set of one or more pickups for converting vibrations of the string set into a music signal, the pickup set including at least one pickup on a front surface of the musical instrument;

a tone-control cavity configured to contain a tone-control system with an interface enabling musician control of a tone or volume of the music signal; and a recording system for recording the music signal, the recording system including:

a recorder occupying the tone-control cavity from which the tone-control system has been removed, the recorder being electrically coupled to the pickup set for receiving, digitizing, and recording the music signal; and a recorder interface having a knob coupled to the recorder through the front surface of the musical instrument;

wherein the recorder has a first mode in which the knob is used to control the tone or the volume of the music signal as it is being recorded, and a second mode in which the knob is used to control a recorder parameter other than the tone or volume of the music signal.

14. The musical instrument of claim 13 wherein the recorder includes:

a pre-capture device that captures a most-recent pre-record duration of the music signal;

the recorder that records durations of the musical signal, the durations including the pre-record duration;

a detector that detects a trigger condition and a time-out condition; and a controller coupled to the pre-capture device, the recorder, and the detector so that:

in response to detection of the trigger condition, the controller causes the recorder to record the pre-record duration followed by a subsequent duration of the music signal; and in response to detection of the time-out condition, the controller causes the recorder to stop recording the music signal at the end of a time-out duration provided the trigger condition is not met during the time-out duration.

15. The musical instrument of claim 13 wherein the recorder further includes a rotary encoder for musician control of the tone of the music signal, the rotary encoder being coupled to the knob.

16. The musical instrument of claim 15 wherein the recorder interface includes a knob coupled to the rotary encoder and a mode selector for selecting:

a first mode in which the knob is operable to control a tone or a volume of the music signal; and a second mode in which the knob is operable to control a value of a parameter associated with a recorder function including recording and playback.

* * * * *